(12) United States Patent
Nakamura et al.

(10) Patent No.: US 6,553,031 B1
(45) Date of Patent: Apr. 22, 2003

(54) COMMUNICATION NODE APPARATUS WITH ROUTING TABLES IN CACHE MEMORIES

(75) Inventors: Ryo Nakamura, Yokohama (JP); Masao Nakayama, Yokohama (JP); Kouichi Asao, Yokohama (JP); Daisuke Okabe, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/372,262

(22) Filed: Aug. 11, 1999

(30) Foreign Application Priority Data

Aug. 2, 1999 (JP) .......................................... 11-218703

(51) Int. Cl.$^7$ ................................................ H04Q 3/00
(52) U.S. Cl. .................. 370/392; 370/359; 370/395.31; 370/397; 370/401; 370/419
(58) Field of Search .................. 370/359, 392, 370/395.3, 395.31, 397, 395.71, 395.72, 400, 401, 402, 412, 419, 395.32

(56) References Cited

U.S. PATENT DOCUMENTS 5,331,635 A * 7/1994 Ota ............................ 370/401
5,600,630 A * 2/1997 Takano et al. .............. 370/397
6,400,715 B1 * 6/2002 Beaudoin et al. ........... 370/392

FOREIGN PATENT DOCUMENTS

| JP | 7177172 | 7/1995 | ..................... 12/46 |
| JP | 9275413 | 10/1997 | ..................... 12/46 |

* cited by examiner

*Primary Examiner*—Dang Ton
*Assistant Examiner*—Shick Hom
(74) *Attorney, Agent, or Firm*—Sofer & Haroun, LLP

(57) ABSTRACT

In a communication node apparatus comprising a plurality of line interfaces each having a cache memory with a sub routing table formed therein, and a route management unit having a main routing table, each of the line interfaces is provided with a function of detecting a disconnection flag included in a received packet and deleting an unnecessary routing information entry from the sub routing table, and a function of registering a routing information entry as a high priority entry if a connection establishment flag is set to a received packet when the routing information entry is downloaded from the main routing table to the sub routing table upon reception of the packet.

9 Claims, 11 Drawing Sheets

FIG. 14

| DESTINATION NETWORK ADDRESS (DA) | NEXT HOP ADDRESS | OUTPUT PORT NO. | ENTRY PRIORITY | |
|---|---|---|---|---|
| 50. 0. 0. 0 | 20. 0. 0. 2 | 2 | 1 | — 150-1 |
| — | — | — | 0 | |

FIG. 15

| DESTINATION NETWORK ADDRESS (DA) | NEXT HOP ADDRESS | OUTPUT PORT NO. | ENTRY PRIORITY | |
|---|---|---|---|---|
| 50. 0. 0. 0 | 20. 0. 0. 2 | 2 | 1 | — 150-1 |
| 60. 0. 0. 0 | 20. 0. 0. 2 | 2 | 1 | — 150-2 |
| 70. 0. 0. 0 | 30. 0. 0. 2 | 3 | 0 | — 150-3 |
| ⋮ | ⋮ | ⋮ | ⋮ | |

FIG. 16

| DESTINATION NETWORK ADDRESS (DA) | NEXT HOP ADDRESS | OUTPUT PORT NO. | ENTRY PRIORITY | |
|---|---|---|---|---|
| 50. 0. 0. 0 | 20. 0. 0. 2 | 2 | 1 | — 150-1 |
|  |  |  | 0 | |
| 70. 0. 0. 0 | 30. 0. 0. 2 | 3 | 0 | — 150-3 |
| ⋮ | ⋮ | ⋮ | ⋮ | |

FIG. 17

| DESTINATION NETWORK ADDRESS (DA) | NEXT HOP ADDRESS | OUTPUT PORT NO. | ENTRY PRIORITY | |
|---|---|---|---|---|
| 50. 0. 0. 0 | 20. 0. 0. 2 | 2 | 1 | — 150-1 |
| 80. 0. 0. 0 | 40. 0. 0. 2 | 4 | 1 | — 150-4 |
| 70. 0. 0. 0 | 30. 0. 0. 2 | 3 | 0 | — 150-3 |
| ⋮ | ⋮ | ⋮ | ⋮ | |

COMMUNICATION NODE APPARATUS WITH ROUTING TABLES IN CACHE MEMORIES

BACKGROUND OF THE INVENTION (1) Field of the Invention

The present invention relates to a communication node apparatus, and more specifically to a communication node apparatus for performing routing processing on packets received from input lines at high speed.

(2) Description of the Related Art

A communication node apparatus for interconnecting a plurality of networks with each other needs to perform routing processing on received packets from respective input lines at high speed. Of the communication node apparatus, routers for routing variable length packets typified by IP (Internet Protocol) packets, for example, have a plurality of line interfaces connected to input/output lines, respectively. As basic control functions, each router has a route calculating function for calculating communication pass information (hereinafter called "routing information") for respective networks, based on a predetermined routing protocol and storing the result of calculation in a memory (hereinafter called "routing table"), and a routing processing (route reference) function for referring to the routing table, based on a destination address of each received packet and transferring or forwarding each received packet to a route specified by the routing information.

In the conventional routers, the route calculating function and the routing processing function have been implemented by one control processor. However, various proposals for improving a processing speed at a router controller have been made with an increase in the scale of each network, the speeding-up of a transmission rate or an increase in data traffic due to the diversification of communication applications.

As one means for speeding up routing processing, there has been proposed a router structure wherein a route calculating function and a routing processing function are separated from each other, which is entitled "Trend: Target on Gygabit/Router Internet Highway Following One Another", p.p. 124–127, the Nov. 3, 1997 of Nikkei Communication (Nikkei BP Co., Ltd.), for example (prior art 1). The above-described reference discloses a router structure wherein processors for routing processing and routing tables are provided every line interface boards and respective routing information calculated by a route calculating processor are distributed to the respective line interface boards, thereby to reduce the load on the route calculating processor and to perform the routing of received packets within the respective line interface boards at high speed. Further, the above-described reference also discloses a router structure wherein the routing processing for each line interface board is implemented by an ASIC (Application Specific Integrated Circuit) which is an IC intended for specific uses or applications.

Japanese Published Unexamined Patent Application No. Hei 7-177172 (prior art 2) has proposed a router which comprises a whole control unit provided with a routing table serving as an original and a route calculating function, a plurality of relay processing units respectively connected to a plurality of input/output lines and having individual routing tables, and wherein when the whole control unit calculates new routing information, the routing information is registered in the original routing table and notified to each relay processing unit via a system bus, so that the respective relay processing units update their individual routing tables.

Japanese Published Unexamined Patent Application No. Hei 9-275413 (prior art 3) has proposed a router which comprises a master module for performing route calculations and a plurality of link modules respectively connected to input/output lines, each of said link modules having a cache memory for storing therein the required minimum of routing information notified from the master module. When information necessary for routing a received packet does not exist in the cache memory, the received packet is transferred to the master module, so that the master module performs the routing on the received packet.

According to the "ATM and IP Integrated Switch Architecture" published in the collection of theses at Communication Society of 1998 of The Institute of Electronics, Information and Communication Engineers, pp.598–599, SB-7-3 (prior art 4), there has been proposed an architecture of an ATM/IP integrated switch wherein an ATM (Asynchronous Transfer Mode) switch and a router are integrated with each other so that IP packets arrived in a form of cells are subjected to IP layer processing as cells as they are. In the above-described switch, each of said line cards (line interface boards) is provided with a cache memory for a routing table, and a processor card having a route calculating function performs transfer processing on a specific packet for which any one of said line cards has failed to resolve the destination. Then the cache memory is immediately brought up to date so that the subsequent packets having the same destination address can be transferred on the respective line cards.

According to the routing system, in which routing tables for storing all the routing information are placed in the respective line interface boards as the prior arts 1 and 2, the routing for the received packets can be advantageously performed on the respective line interface boards at high speed, but it needs numbers of memories each having large capacity.

On the other hand, according to the routing system, in which cache memories each having relatively small capacity are placed in the respective line interface boards as the prior arts 3 and 4, it needs to download a new routing information entry to the line interface from the route calculation unit storing all the routing information when routing information necessary for a received packet is not found in the cache memory.

If the storage capacity of the cache memory is filled up in this case, it is necessary to delete any of the already registered routing information entries in order to accept the new routing information entry. However, the prior arts do not provide a beneficial proposal about the deletion of the routing information from the cache memory. Accordingly, a problem arises in that downloading requests on the same routing information deleted once from the cache memory are issued repeatedly and the unreasonable update processing of the cache memory delays the speed of the routing processing.

SUMMARY OF THE INVENTION

It is an object of the present invention to provide a communication node apparatus capable of deleting unnecessary routing information from a cache memory on each line interface board with suitable timing.

It is another object of the present invention to provide a communication node apparatus capable of registering new routing information while avoiding a repetition of unreasonable updating processing of a cache memory to the utmost when the cache memory on each line interface board is filled up.

In order to achieve the above objects, a communication node apparatus according to the present invention comprises a route management unit having a main routing table for storing therein a plurality of routing information entries necessary for communication node, and a plurality of line interfaces equipped to every input and output lines, wherein each of said line interfaces includes a sub routing table for storing therein a limited number of routing information entries loaded from the route management unit, a received packet processing circuit for performing routing processing on a packet received from one of said input lines by referring to the sub routing table, and a table management unit for eliminating a specific routing information entry already registered in the sub routing table, based on predetermined information extracted from said packet received from said input line.

The table management unit checks, for example, a control information field defined in a predetermined position of each of said packets received from the input line and deletes a specific routing information entry, which corresponds to a specific packet having first control information contained in the control information field, from the sub routing table.

Another feature of the present invention resides in that the table management unit includes registering means for requesting the route management unit to download a non-registered routing information entry corresponding to the packet received from the input line and registering a new routing information entry downloaded from the route management unit in the sub routing table.

A further feature of the present invention resides in that the registering means checks a control information field defined in a predetermined position of the packet received from the input line, and registering a routing information entry downloaded in association with a specific packet which includes second control information in said control information field, into said sub routing table together with a high priority indication. According to the priority indication, the registering means can sacrifice any free of the high priority indication, of the routing information entries already registered in the sub routing table, in order to register the new routing information entry into the sub routing table when no idle area exists in a sub routing table.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings.

BRIEF DESCRIPTION OF THE DRAWINGS

FIG. 14 is a diagram showing the state of registered entries in a sub routing table 15 held by a communication node apparatus 300A shown in FIG. 13;

FIG. 15 is a diagram showing the state of the sub routing table 15 subsequent to the addition of entries thereto;

FIG. 16 is a diagram showing the state of the sub routing table 15 subsequent to the deletion of one entry therefrom;

FIG. 17 is a diagram showing the subsequent addition of an entry to the sub routing table 15.

DESCRIPTION OF THE PREFERRED EMBODIMENTS

Preferred embodiments of the present invention will hereinafter be described with reference to the accompanying drawings.

Figure 1:
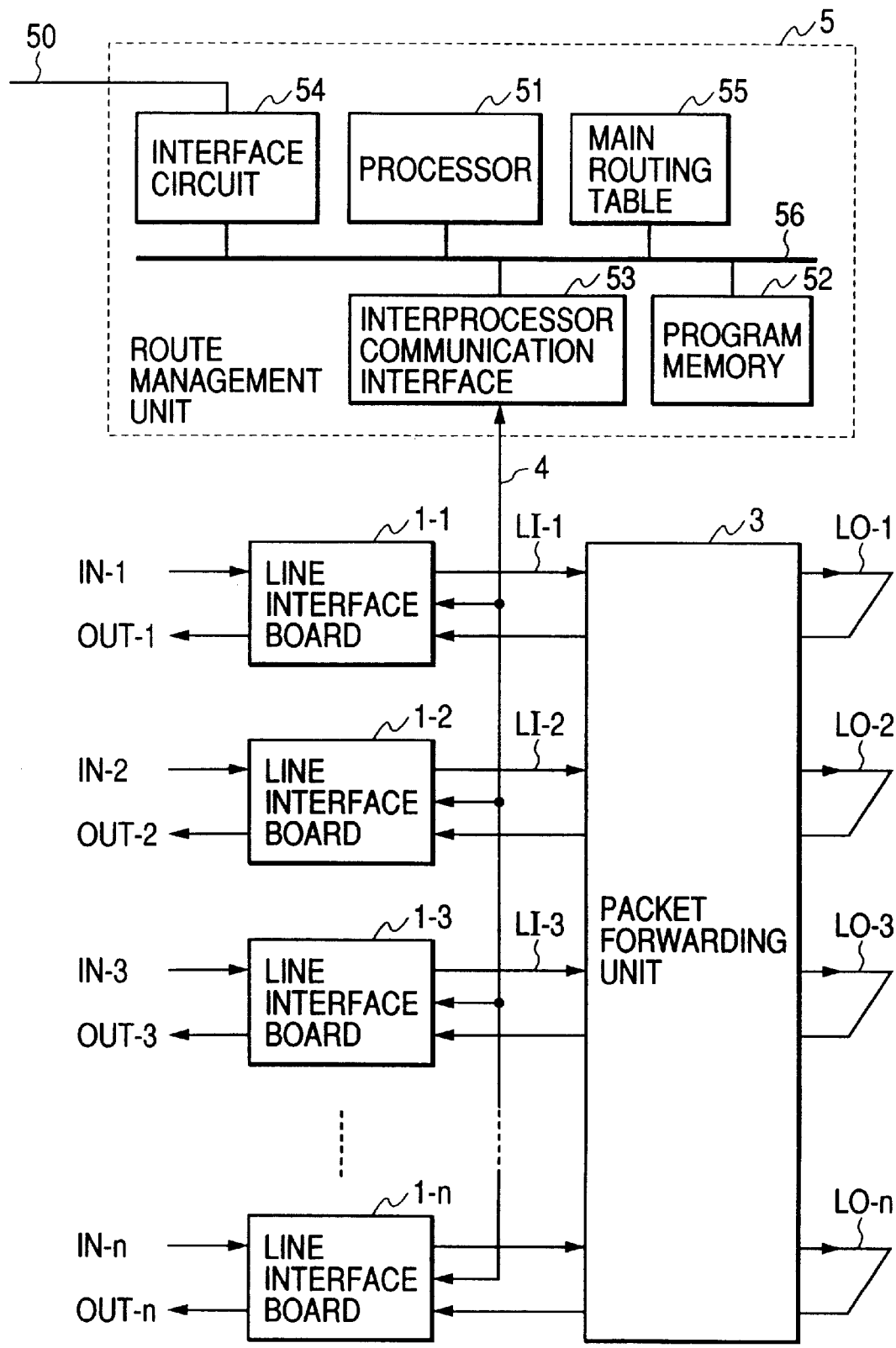
FIG. 1 is a diagram showing one embodiment of a communication node apparatus according to the present invention.

FIG. 1 shows one embodiment of a communication node apparatus according to the present invention, which has the function of routing variable length packets.

The communication node apparatus according to the present invention comprises a plurality of line interface boards 1 (1-1 though 1-n) each of which accommodates a pair of input line IN-i (i=1 to n) and output line OUT-i (i=1 to n) therein, a packet forwarding unit 3 for transferring packets inputted from each of said line interfaces 1 to any of other line interfaces, and a route management unit 5 connected to the respective line interfaces 1 through a signal line (bus) 4.

As will be described later in FIG. 5, each of the line interface boards 1-i (I=1 to n) is provided with a sub routing table (cache memory) 15. By retrieving the sub routing table 15 based on a destination address contained in a header of a variable length packet (e.g., IP packet) received from each input line IN-i, an output line number used to send the received packet is specified. In embodiments which will be described hereinafter, each of the line interface boards 1-i converts the received variable length packet to a plurality of fixed length short packets (hereinafter called "cells"), and outputs the short packets to an input port LI-i of the packet forwarding unit 3. Each cell is added with an internal header including an output line number (output port number) retrieved from the routing table 15.

The packet forwarding unit 3 transfers the cells received from the respective input ports LI-i to output ports LO (LO-1 through LO-n) designated by the output port numbers included in the respective internal headers. Each of the line interface boards 1-i temporarily stores the cells received from the output ports LO-i of the packet forwarding unit 3, converts them to the original variable length packets and thereafter sends the converted packets to an output line OUT-i associated therewith.

The route management unit 5 comprises a processor 51, a program memory 52 for storing various programs to be executed by the processor 51, an interprocessor communication interface 53 for accommodating the signal line 4, an interface circuit 54 connected to an external signal line 50, a main routing table (memory) 55 for storing all the routing information necessary for the respective line interface boards 1 therein, and an internal bus 56 for interconnecting these components to each other.

The processor 51 executes a predetermined routing protocol, based on management information or network configuration information inputted from the interface circuit 54 via the external signal line 50 thereby to calculate routing information necessary for the communication node apparatus and update the main routing table 55. Further, the processor 51 reads out a specific routing information entry from the main routing table 55 in response to a routing information download request issued from each line interface board 1 and transfers the routing information to its request-source line interface board through the Interface circuit 53.

Figure 2:
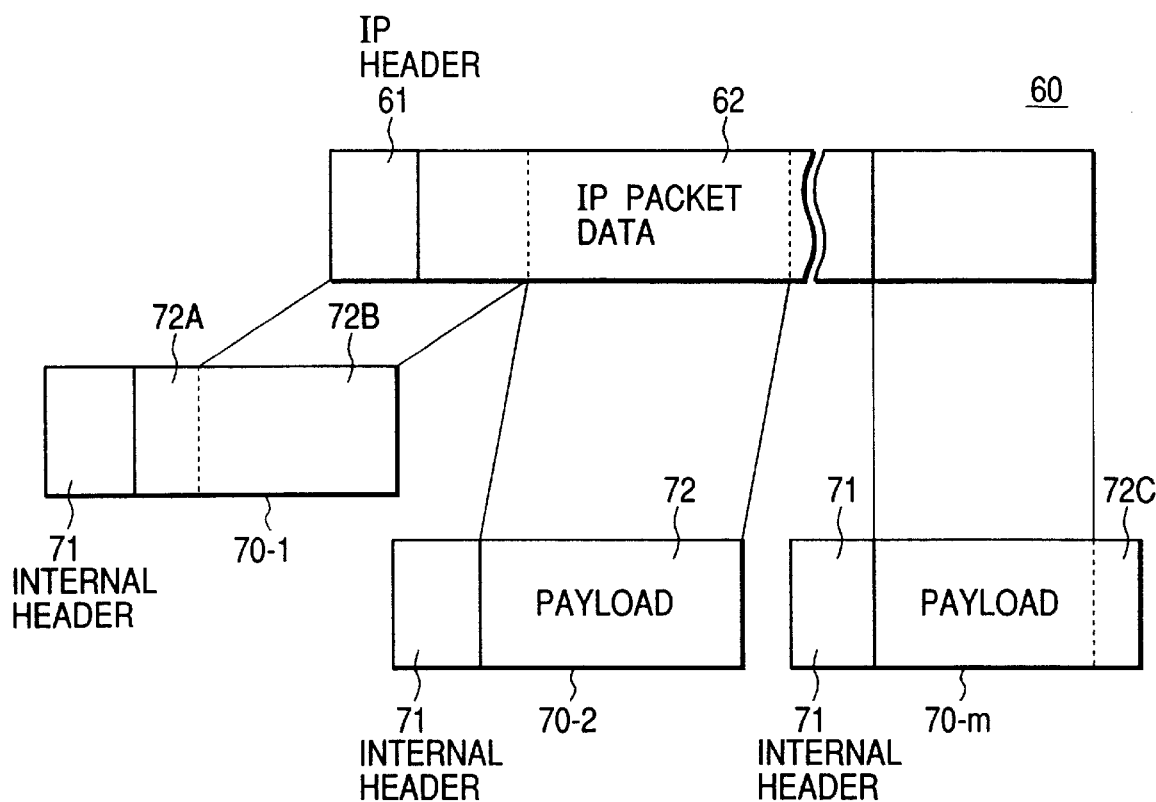
FIG. 2 is a diagram for describing the relationship between a variable length packet and fixed length short packets (cells) both handled in a line interface.

FIG. 2 shows the relationship between a variable length packet 60 and fixed length short packets (cells) 70 both handled in the line interface board 1-i.

The variable length packet 60 described herein is an IP (Internet Protocol) packet (IP datagram) defined by a network layer protocol available in the OSI (Open System Interconnection) model of ISO (International Organization for Standardization). The variable length packet 60 comprises an IP header 61 and IP data 62.

Figure 4:
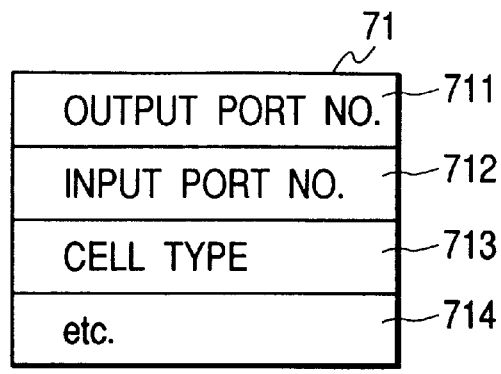
FIG. 4 is a diagram illustrating a format of an internal header added to each cell.

Each line interface board 1-i divides the IP packet 60 received from its corresponding input line IN-i into a plurality of data blocks and converts the IP packet to a plurality of fixed length cells 70 (70-1, 70-12, . . . ) containing these data block in their payloads 72. An internal header 71 shown in FIG. 4 is attached to each cell 70.

In one embodiment according to the present invention, the cell (hereinafter called "first cell") 70-1 for carrying the first or initial data block of an IP packet includes, at a leading portion 72A of the payload 72, a Next Hop address necessary to generate a data link layer header at the OSI model as will be described later, followed by the first data block of the IP packet including the IP header 61. In a cell (hereinafter called "final cell") 70-m for carrying the final data block of the IP packet, the rear of the data block is padded with dummy data 72C in order so that the payload 71 is adjusted to a predetermined length.

Figure 3:
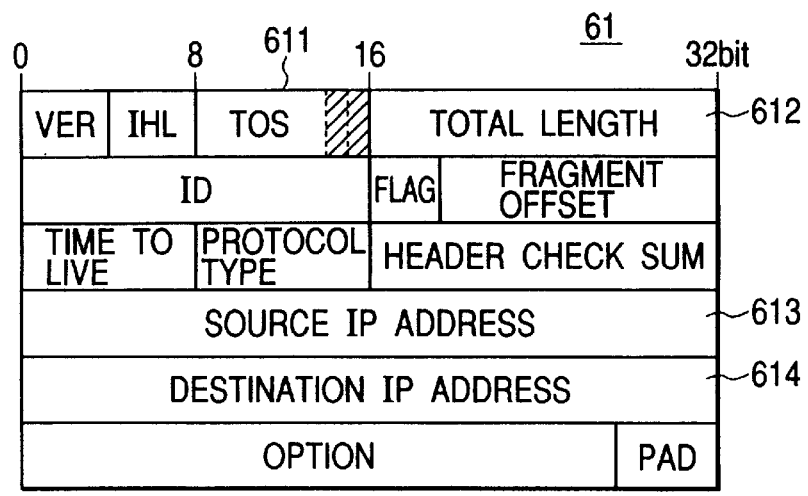
FIG. 3 is a diagram illustrating a format of an IP header.

FIG. 3 shows a format of the IP header 61.

The IP header 61 has a length of 32×6 bits and includes as header information, a version number VER of an IP protocol, an IP header length IHL, a type of service (TOS) 611, a total length 612 of IP datagram, indication of a fragment, a fragment offset, time to live for indicating the remaining number of transitable or passable routers, a protocol type for identifying an upper layer protocol included in an IP data field 62, a header check sum for detecting an error of the IP header, a source IP address 613, a destination IP address 614, an option, and padding PAD as shown in the drawing.

In one embodiment according to the present invention, two least significant bits of the TOS 611, shown as diagonally shaded fields in FIG. 3, are defined as a flag field indicative of the establishment (set up) and disconnection of a connection and are used to control the updating of an entry in the sub routing table for each line interface board 1-i. A source terminal for the IP packet sets, for example, a binary representation bit pattern "11" in the flag field upon the connection establishment and sets a bit pattern "10" upon the disconnecting of the connection.

The connection establishment flag "11" may be set to the first user packet for each connection, including effective data in the IP data field 62, or may be set to a header of a control IP packet including dummy data, which is transmitted prior to the first user packet. Similarly to this, the disconnection flag "10" may also be set to the final user packet for the connection, which includes effective data, or may be set to a control IP packet including dummy data, which is sent subsequently to the final user packet.

FIG. 4 shows a format of the internal header 71 to be added to each cell.

The internal header 71 includes an output port number 711 corresponding to an output line to which a variable length packet is transmitted, an input port number 712 corresponding to an input line of the variable length packet, and a cell type 713 indicative of whether the cell associated with the internal header corresponds to any of the first cell, the final cell and an intermediate cell within the variable length packet.

The above three cell types can be represented by two bits. Further, the output port number 711 and the input port number 712 can be represented by three bits respectively if the number n of the line interface boards held in the switch 3 is less than or equal to 8. Therefore, the above-described three items can be compiled into an internal header having a 8-bit length in a small-scale communication node apparatus in which the number of the line interface boards is 8 or less. If the number n of the line interface boards ranges from 16 to 128 for the similar reason, then the three items can be compiled to an internal header having a 16-bit length. However, a dummy byte 714 may be contained in the above-described internal header 71 to facilitate, for example, the operation of counting of the number of bytes at the conversion of the variable length packet 60 to the cells and vice versa.

Figure 5:
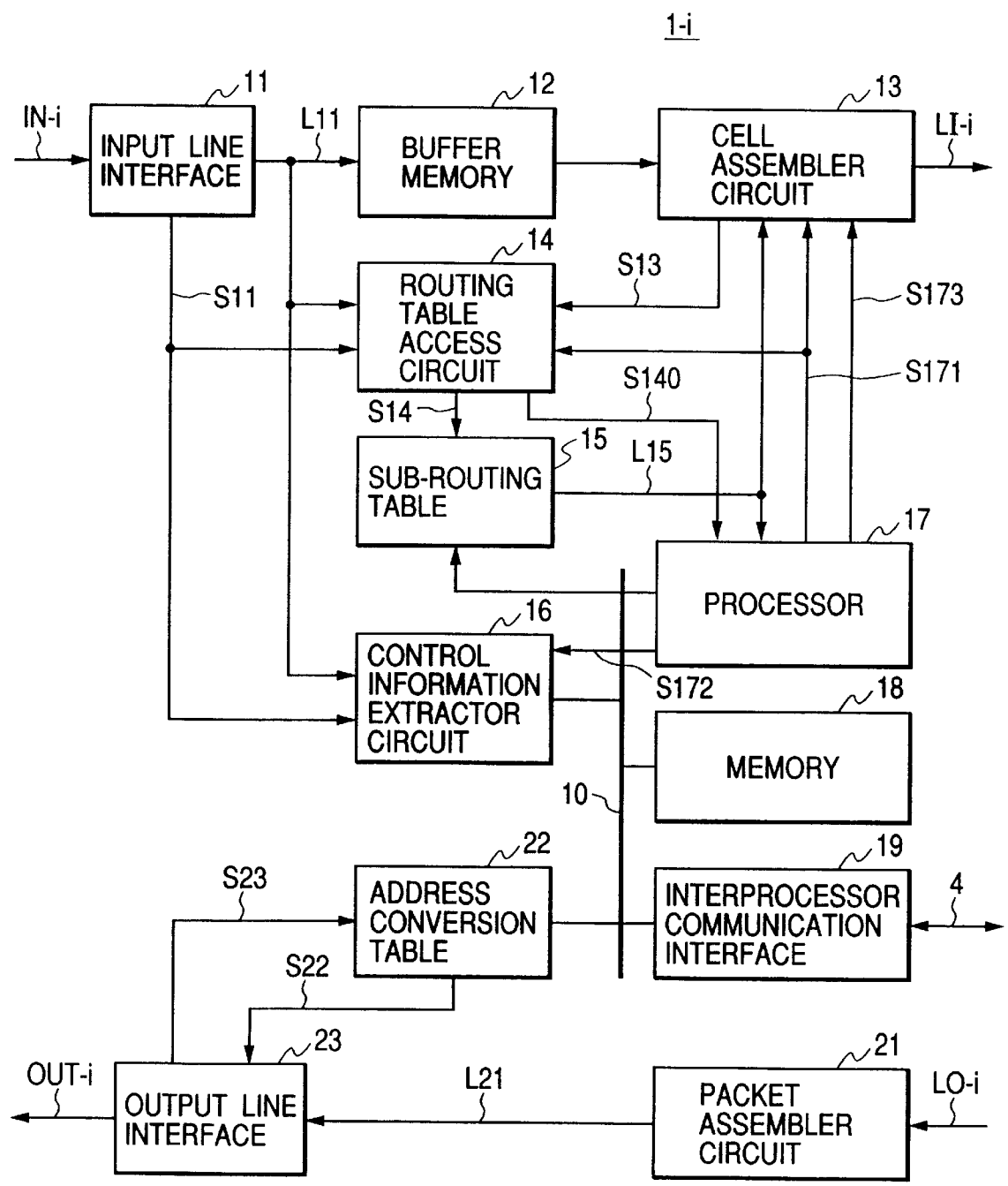
FIG. 5 is a structural diagram showing one embodiment of a line interface board 1-i shown in FIG. 1.

FIG. 5 shows an example of a configuration of the line interface board 1-i.

Each line interface board comprises an input interface unit, an output interface unit, and a table management unit.

The input interface unit comprises an input line interface 11 for receiving an electric (or optical) signal inputted from an input line IN-i, and performing termination processing of a protocol on a physical layer (first layer) and a data link layer (second layer) at the OSI model to extract IP packets, a buffer memory 12 for temporarily storing the IP packets outputted from the input line interface 11 on a first-in, first-out basis, a cell assembler circuit 13 for converting the IP packet read out from the buffer memory 12 to fixed length short packets, a sub routing table (cache memory) 15, and a routing table access circuit 14 for reading out routing information from the sub routing table 15.

The delivery of the IP packet from the input line interface 11 is performed in units of 8 bits, 16 bits or 32 bits depending on a bit width of an output signal line L11. In the following description, the IP packet will be sent out from the input line interface 11 in a 16-bit parallel configuration and the 16 bits will be defined as one byte.

Figure 6:
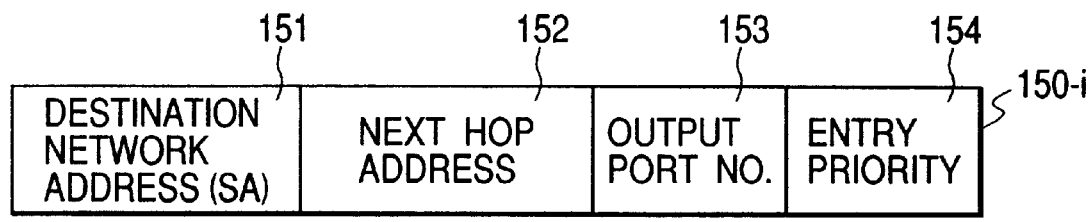
FIG. 6 is a diagram illustrating a configuration of a routing information entry registered in a sub routing table 15.

The sub routing table 15 is a table provided in as a cache memory, for temporarily storing therein the copies of some of routing information entries held in the main routing table 55. As shown in FIG. 6 by way of example, the sub routing table 15 stores therein a plurality of entries 150-i defining the relationship among a Next Hop address 152, an output port number 153 and an entry priority 154 in association with a destination network address (SA) 151. Of these routing information, the items 151 through 153 are those downloaded from the main routing table 51 included in the route management unit 5. The entry priority 154 is an item peculiar to the sub routing table 15 and has a different value depending on whether the connection establishment flag has received or not.

The routing table access circuit 14 counts the number of bytes of each IP packet outputted to the signal line L11, with a synchronizing signal S11 generated by the input line interface 11 in synchronism with the transmission of a leading byte of each IP packet as a start point, thereby extracting a destination IP address 614 from the header of each IP packet. The routing table access circuit 14 accesses to the sub routing table 15, based on each destination IP address 614 to read out a Next Hop address 152 and an output port number 153 corresponding to the destination IP address 614.

In the present embodiment, as will be described later, the routing table access circuit 14 is prohibited from accessing to the sub routing table 15 when a hold signal S171 outputted from a processor 17 is held ON or a hold signal S13 outputted from the cell assembler circuit 13 is held ON. The routing table access circuit 14 includes an address buffer (FIFO) to store the destination IP address extracted from an IP packet inputted during the prohibition period of the access to the routing table 15, and is constructed so as to access the sub routing table 15 based on the destination IP addresses read out from the address buffer successively.

The cell assembler circuit 13 is supplied with a Next Hop address 152 and an output port number 153 read out from the sub routing table 15 to a signal line L 15. The cell assembler circuit 13 generates an internal header 71, based on a cell type determined in a cell generation sequence for each IP packet, an input port number which is peculiar to each line interface board and stored in the cell assembler circuit, and an output port number 153 supplied from the signal line L15 and coverts each IP packet read out from the buffer memory 12 to a plurality of fixed length cells in succession. Incidentally, the Next Hop address 152 supplied through the signal line L15 is inserted into the payload leading portion 71A of the first cell of each IP packet as described in FIG. 2.

The cell assembler circuit 13 brings the hold signal S13 to an ON state during cell assembling of each IP packet to thereby restrain the reading of routing information from the sub routing table 15 by the routing table access circuit 14. Further, the cell assembler circuit 13 switches the hold signal S13 to an OFF state when the reception of the next routing formation is made possible. When the hold signal S171 is changed from the OFF state to the ON state, the cell assembler circuit 13 invalidates data received from the signal line L15 and waits for a change of the hold signal to the OFF state. When the cell assembler circuit 13 receives a packet discard pulse S173 from the processor 17, the cell assembler circuit 13 reads out and discards data corresponding to one packet from the buffer memory 12.

The table management unit of each line interface board comprises a control information extractor circuit 16, a processor 17, a memory 18 for storing various programs to be executed by the processor 17, an interprocessor communication interface 19 connected to the route management unit 5 through a signal line 4, and an internal bus 10 for interconnecting these components.

Figure 7:
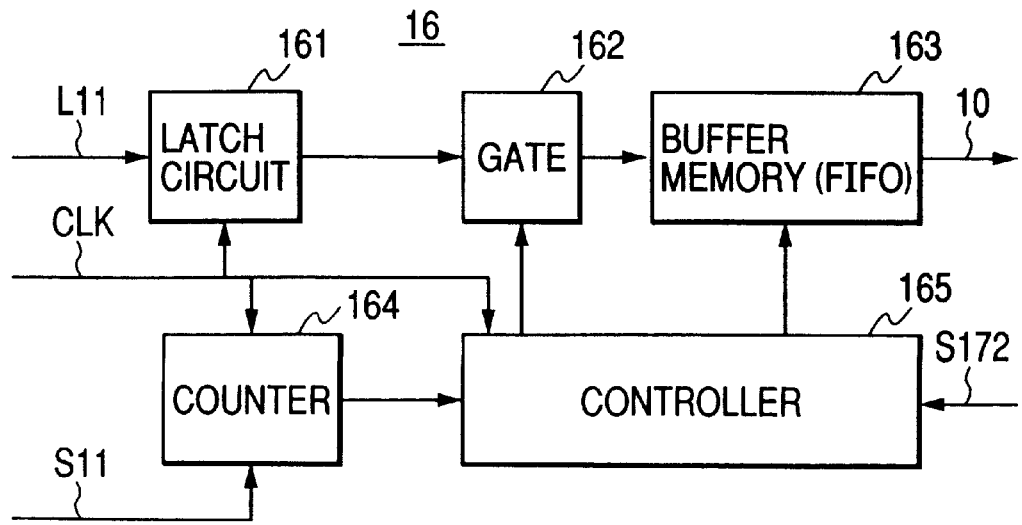
FIG. 7 is a diagram illustrating one embodiment of a control information extractor circuit 16 shown in FIG. 5.

The control information extractor circuit 16 is used to extract a TOS field 611 and a destination IP address 614 of each IP header 61. The control information extractor circuit 16 is constructed as shown in FIG. 7 by way of example. In FIG. 7, CLK indicates a clock synchronized with a byte cycle of each IP packet sent out from the input line interface 11, and S11 indicates a clock synchronized with the leading byte of each IP packet. In the control information extractor circuit 16, a latch circuit 161 takes in or captures each IP packet outputted to the signal line L11 from the input circuit interface 11 in byte units and a buffer memory 163 stores specific bytes of each IP packet selected by a gate 162. Reference numeral 164 indicates a counter for indicating the position of the bytes in each IP packet, which counts the byte clock CLK with the clock S11 as a start point.

A controller 165 decodes a count value outputted from the counter 164 to selectively open the gate 162 at the receiving timings of a first byte. (0 to 16 bits) of the IP header shown in FIG. 3, where the TOS 611 is located, and ninth and tenth bytes thereof where the destination IP address 614 is located so as to store these bytes into the buffer memory 163 as control information. In response to a request signal S172 issued from the processor 17, the controller 165 reads out a set of control information (first, ninth and tenth bytes of each IP header) from the buffer memory 163 to the internal bus 10 in a first-in, first-out manner.

Figure 8:
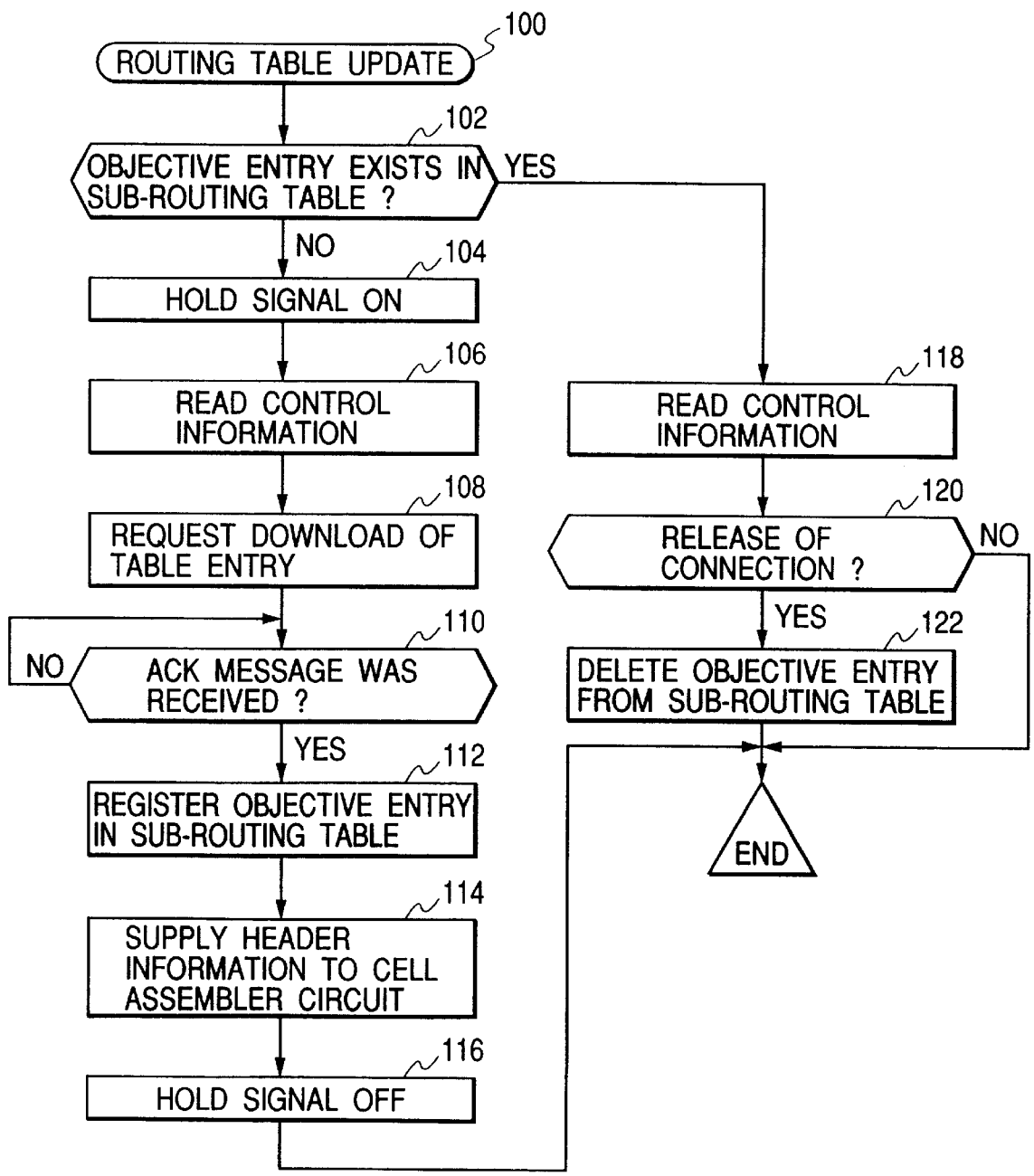
FIG. 8 is a flowchart showing one embodiment of a sub routing table update routine executed by a processor 17 shown in FIG. 5.
Figure 9:
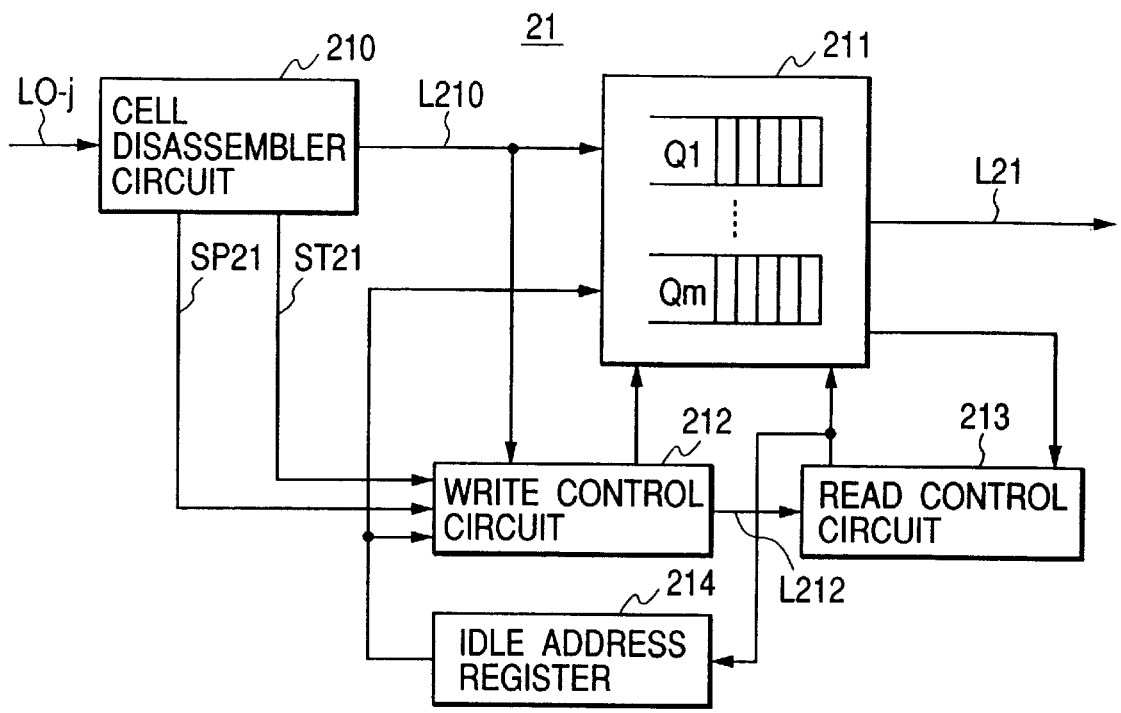
FIG. 9 is a diagram illustrating one embodiment of a packet assembler circuit 21 shown in FIG. 5.

FIG. 8 is a flowchart of an update routine of the sub routing table 15, which is executed by the processor 17.

This routine is executed in response to a timing signal S140 generated when the routing table access circuit 14 accesses to the sub routing table 15. The processor 17 first checks data appeared on the signal line L15 which is outputted from the sub routing table 15 to determine whether an object entry, which is a routing information entry corresponding to the destination address of each IP header, has already been registered in the sub routing table 15 (Step 102).

If it is determined that the object entry has been registered, i.e., the effective data has been outputted to the signal line L15, the processor 17 generates a read request signal S172 in order to read out a set of control information from the buffer memory 163 by the control information extractor circuit 16 (Step 118). Next, the processor 17 refers to a TOS 611 contained in the first byte of the control information to determine whether the two least significant bits indicate a disconnection flag (Step 120). If the disconnection flag was not indicated, this routine is terminated. If the two least significant bits of TOS have indicated the disconnection flag, then the object entry specified by the destination address indicated by the second and third bytes of the control information is deleted from the sub routing table 15 (Step 122) and thereafter this routine is terminated. The deletion of the object entry is carried out through the internal bus 10.

If it was determined that the object entry was not registered in the sub routing table in Step 102, then the processor 17 brings a hold signal S171 to an ON state. Thus, the cell assembler circuit 13 invalidates the output of the routing table and the routing table access circuit 14 temporarily stops accessing to the routing table. Next, the processor 17 generates a read out request signal S172 to read a set of control information from the buffer memory 163 by the control information extractor circuit 16 (Step 106) and issue a download request message of a routing table entry related to the destination addresses indicated by the second and third bytes of the control information (Step 108). The download request message is transmitted to the route management unit 5 through the interprocessor communication interface 19.

The processor 17 waits for an ACK message from the route management unit (Step 110). Upon receiving the ACK message, the processor 17 registers a new entry 150 indicated by the ACK message in the sub routing table 15 through the internal bus 10 (Step 112). At this time, the processor 17 checks the first byte of the control information set already read out in Step 106. If the two least significant bits of TOS indicate the connection establishment flag "11", an entry priority 154 is set to "1". If it is found that the two least significant bits of TOS do not indicate the connection establishment flag, then the entry priority 154 is set to "0".

Thereafter, a Next Hop address 152 and an output port number 153 contained in the new entry are supplied to the cell assembler circuit 13 through the signal line L15 (Step 114) and the hold signal S171 is restored to an OFF state (Step 116). Thus, the access to the sub routing table by the halted routing table access circuit 14 is restarted so that the next IP packet is converted into cells by the cell assembler circuit 13.

Here, the registration of the new entry in Step 112 referred to above is effected on an idle area of the sub routing table 15. According to the present embodiment, since unnecessary entries are deleted one after another in Step 122 upon detection of the disconnection flag, idle areas prepared in the sub routing table 15 at all times and new entries can hence be additionally registered in these idle areas. If no idle areas exist in the sub routing table 15 when it is required to register a new entry, then an entry to be sacrificed is selected among the entries having the entry priority 154 placed in a "0" state, and the new entry may be overwritten thereon.

Among the entries with the entry priority 154 in the "0" state, such entries are included that were registered, for example, upon receiving of a single-shot packet or sporadic transmission packets. For these entries, the potential to be referred by the subsequent packets is extremely low. On the other hand, entries with the entry priority 154 in the "1" state are in association with connections alive at present and have a high possibility that subsequent packets which should refer to these entries will be arrive one after another. Accordingly, if one of the entries with the entry priority 154 in the "0" state is sacrificed while leaving the entries having the entry priority 154 in the "1" state in the sub routing table, it is expected with a high possibility that the number of times of routing information download will be reduced and whereby the time required to effect routing processing on the received packet will be shortened.

When an ACK message indicative of the absence of the corresponding entry in the main routing table 55 is received from the route management unit 5 in response to a download request of routing information, the processor 17 may output a packet discard signal S173 to the cell assembler circuit 13 in place of Steps 112 and 114.

Referring back to FIG. 5, the output interface unit of each line interface board 1 comprises a packet assembler circuit 21, an output line interface 23 and an address conversion table (memory) 22.

The packet assembler circuit 21 is used to convert a cell received from the packet forwarding unit 3 to an IP packet having a Next Hop address at its leading portion or header. The packet assembler circuit 21 comprises a cell disassembler circuit 210 connected to an output port LO-j of the packet forwarding unit 3, a buffer memory 211, a write control circuit 212, a read control circuit 213, and an idle address register 214.

The cell disassembler circuit 210 removes internal headers 71 from respective output cells supplied from the packet forwarding unit 3. Further, the cell deassembler circuit 210 outputs an input port number 712 and a cell type 713 extracted from the internal header 71 to signal lines SP21 and ST21 respectively and outputs the contents (data block) of a payload 72 of the output cell to a signal line L210.

The write control circuit 212 forms a plurality of logical queues Q1 through Qm corresponding to the input port numbers within the buffer memory 211 and queues data blocks outputted to the signal line L210 into one of queues corresponding to the input port number. In order to perform the above-described queuing, the write control circuit 212 is provided with a control table comprised of a plurality of entries for storing, e.g., a queue leading address, a pointer address and packet length for each input port number. Idle addresses taken out from the idle address table 214 are set as the pointer addresses to the respective entries of the control table as initial values in advance.

When the cell type outputted on the signal line ST21 indicates the first cell, the write control circuit 212 stores as a queue leading address, a first address stored as a pointer address in the table entry corresponding to the input port number received from the signal line SP21 and stores a data block of the first cell outputted to a signal line L210 in a memory area started from the first address within the buffer memory 211. At this time, the sum of the length of a Next Hop address located at the leading portion of the data block and a total length 612 extracted from the second byte of each IP address is stored in the table entry as a packet length. A second address taken out from the idle address register 214 is stored in the buffer memory 211 as a pointer address in association with the data block of the first cell. Said second address is also stored in the table entry as a new pointer address.

When the cell disassembler circuit 210 processes a cell other than the first cell, the write control circuit 212 stores a data block outputted to the signal line L210 in the buffer memory 211 by using a pointer address indicated by a management table entry corresponding to the input port number as a write address and stores a third address taken out from the idle address register 214 in the control table entry and buffer memory as a new pointer address. By repeating the above operation, the IP packets each having a Next Hop address at a leading portion are sequentially assembled within the buffer memory 211 in the form stored in logical queues corresponding to the input port numbers. When the cell type present at the signal line ST21 indicates the final cell, the write control circuit 212 performs the operation for storing the data block in the buffer memory and for updating the pointer address and thereafter notifies a queue leading address and a packet length lying within the control table entry corresponding to the final cell to the read control circuit 213 through the signal line L212.

Figure 10:
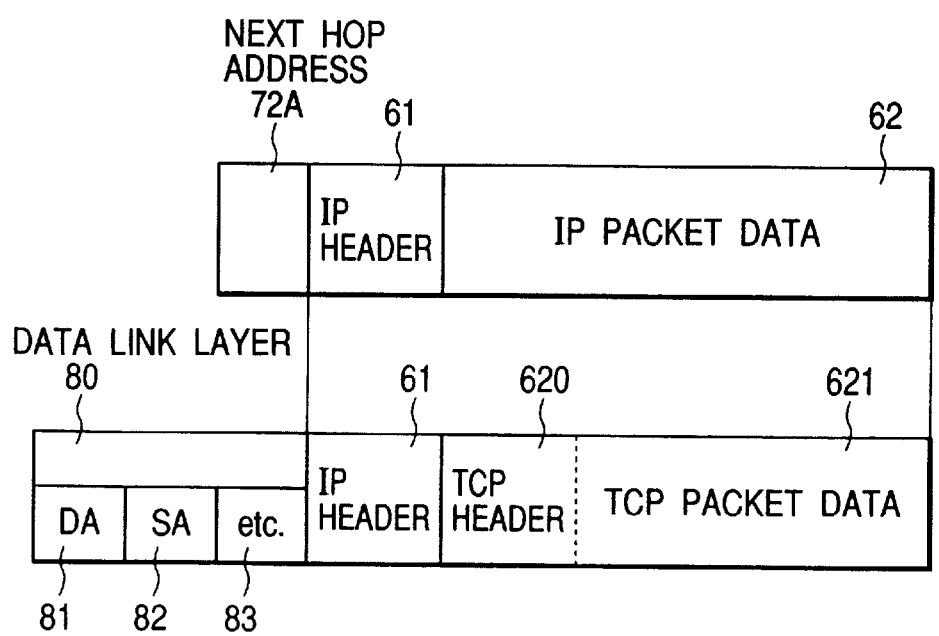
FIG. 10 is a diagram depicting the packet conversion, which is carried out by an output line interface 23 shown in FIG. 5.

The read control circuit 213 reads out the first data block from the buffer memory 211 to a signal line L21 by using the queue leading address notified from the write control circuit 212 as a read address. At this time, a pointer address is read out from the buffer memory 211 together with the data block. The next data block can be read out from the buffer memory 211 by using the pointer address as the next read address. By repeating the above described read operation, the contents of the IP packets can be outputted to the signal line L21 one after another. The read control circuit 213 releases the unnecessary pointer addresses to the idle address register 214 each time the data blocks are read out from the buffer memory 211. Further, read control circuit 213 sum up the lengths of the read out data for each reading of data from the buffer memory 211. When the sum of the read out data lengths reaches a packet length notified from the write control circuit 212, the operation for reading out data corresponding to one packet is completed. Thus, packet data 63 having a Next Hop address 72A at its leading portion and followed by an IP header 61 and an IP packet data 62 as shown in FIG. 10 is outputted to the signal line L21.

When the output line interface 23 receives the packet 63 from the signal line L21, it accesses to the address conversion table 22, based on the Next Hop address 72A. The address conversion table 22 defines the relationship between Next Hop addresses and physical destination addresses (MAC destination addresses) in a data link layer (second layer) at the OSI model. The contents of the address conversion table 22 is suitably updated by the route management unit 5 through the communication interface 19. The physical destination address indicates the address of an input interface unit of a post-stage data communication system having the Next Hop address.

The output line interface 23 generates a data link layer header 80, based on a data link layer destination address 82 read out from the address conversion table 22 in association with the Next Hop address 72A, a source address 81 of the data link layer and other information 83 stored in the output line interface 23 in advance, and converts the received packet 63 to a packet 64 having a data link layer header 80 in place of the Next Hop address 72A. Further, the packet 64 is converted into a signal format corresponding to a physical layer protocol on each output line OUT-I to deliver to the output line OUT-i.

Figure 11:
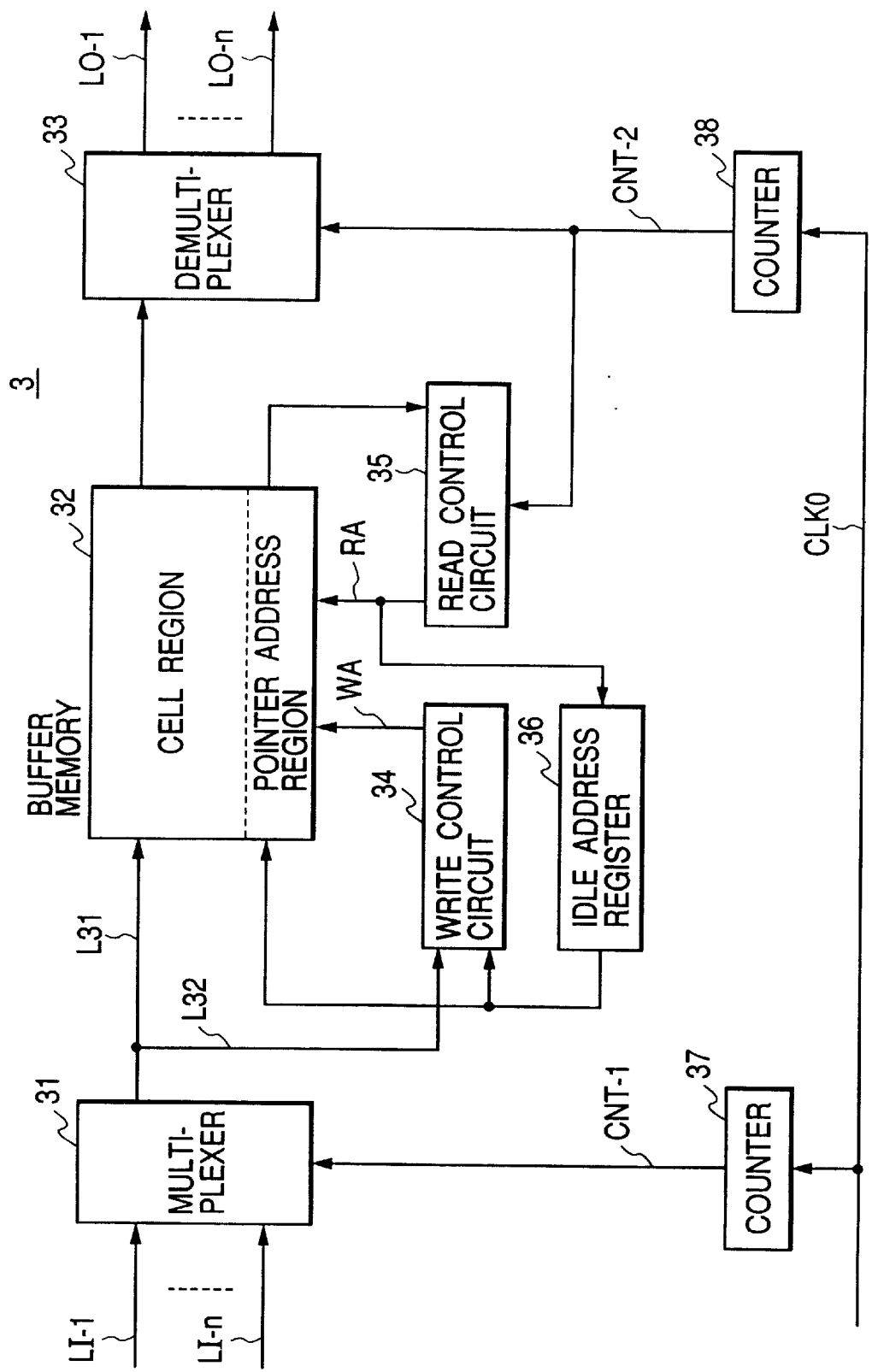
FIG. 11 is a structural diagram showing one embodiment of a switch 3 shown in FIG. 1.

FIG. 11 shows an embodiment of the packet forwarding unit 3.

As the packet forwarding unit 3, a common buffer type fixed-length packet switch is applicable which comprises, as shown in the drawing, a multiplexer 31 for outputting input cells received in parallel from a plurality of input ports LI-1 through LI-n to a signal line L31 having a width of a plurality of bits in time sequence, a buffer memory (common buffer) 32 connected to the signal line L31, a demultiplexer 33 for distributing the cells read out from the buffer memory 32 to a plurality of output ports LO-1 through LO-n on a cyclic basis, a write control circuit 34 for queuing the cells outputted to the signal line L31 into logical queues formed within the buffer memory 32 corresponding to the output ports, a read control circuit 35 for sequentially reading out the cells from the logical queues, an idle address register 36, and counters 37 and 38 with the number of ports n defined as the upper limits of their counts respectively.

In the above-described switch, the writing (W) of a cell to the buffer memory 32 and the reading out (R) of a cell from the buffer memory 32 are alternately performed. The counter 37 starts counting on the rising edge of a clock pulse CLK0 turned on and off during a R/W period of one cell, for example. The counter 38 starts counting on the falling edge of the clock pulse CLK0. The multiplexer 31 selects an input port specified by a value CNT-1 outputted from the counter 37 to thereby output the cell inputted from each of the input ports LI-1 through LI-n to the signal line L31 in time sequence. The demultiplexer 33 outputs the cell read out from the buffer memory 32 to the output port corresponding to a value CNT-2 outputted from the counter 38.

An input cell 70 outputted from the multiplexer 31 is inputted to the buffer memory 32 through the signal line L31. At this time, an output port number 711 contained in the internal header information of the input cell is supplied to the write control circuit 34 through the signal line L32.

The write control circuit 34 is provided with a write control table for storing therein pointer addresses correspondingly to the output port numbers. When an output port number is inputted from the signal line L32, the write control circuit 34 writes the input cell into a cell region of the buffer memory 32 by using a pointer address corresponding to the output port number read out from the control table as a write address WA. At this time, an idle address taken out from the idle address register 36 is written into a pointer address region of the buffer memory 32 as well as into the write control table as a new pointer address. Under the operation of the write control circuit 34, a group of cells having the same output port number are stored in the buffer memory 32 in input order in a form linked by their pointer addresses.

The read control circuit 35 is provided with a read control table for storing therein pointer addresses correspondingly to the output port numbers and accesses the buffer memory 32 by using a pointer address corresponding to an output port number designated by the value CNT-2 outputted from the counter 38 as a read address RA. Thus, one cell and a pointer address associated with the cell are read out from the buffer memory 32. The cell read out from the buffer memory 32 is delivered through the demultiplexer 33 to an output port specified by the counter output value CNT-2. On the other hand, the pointer address read out from the buffer memory 32 is stored in the read control table as a pointer address to be used in the next read cycle relative to the same output port. The pointer address already used as the read address RA is released to the idle address register 36. Under the above-described operation of the cell read control circuit 35, the input cells supplied from the input ports LI-1 through LI-n are transferred to the output ports specified by their internal headers (output port numbers) in input order, respectively.

Incidentally, for example, a matrix-type switch or a bus-type transfer apparatus may be applied as the packet forwarding unit 3 in addition to the aforementioned common buffer type fixed-length packet switch.

In the above-described embodiment, a source terminal of packets sets a flag indicative of the establishment or disconnection of the connection into a TOS field of the IP header, and each of line interface boards of a communication node apparatus having received the IP packet determines an entry priority of routing information downloaded to a sub routing table, according to the presence or absence of the flag. However, the header 620 of the TCP packet, which is included in the data portion 62 of the IP packet as shown in FIG. 10, for example, may be used for the notification of establishment and disconnection of the connection from a source terminal to the communication node apparatus.

According to the OSI model, the establishment and disconnection of the communication connection between data communication terminals are defined in the TCP (Transaction Control Protocol) which is a protocol of a transport layer (fourth layer) located above the IP protocol.

Figure 12:
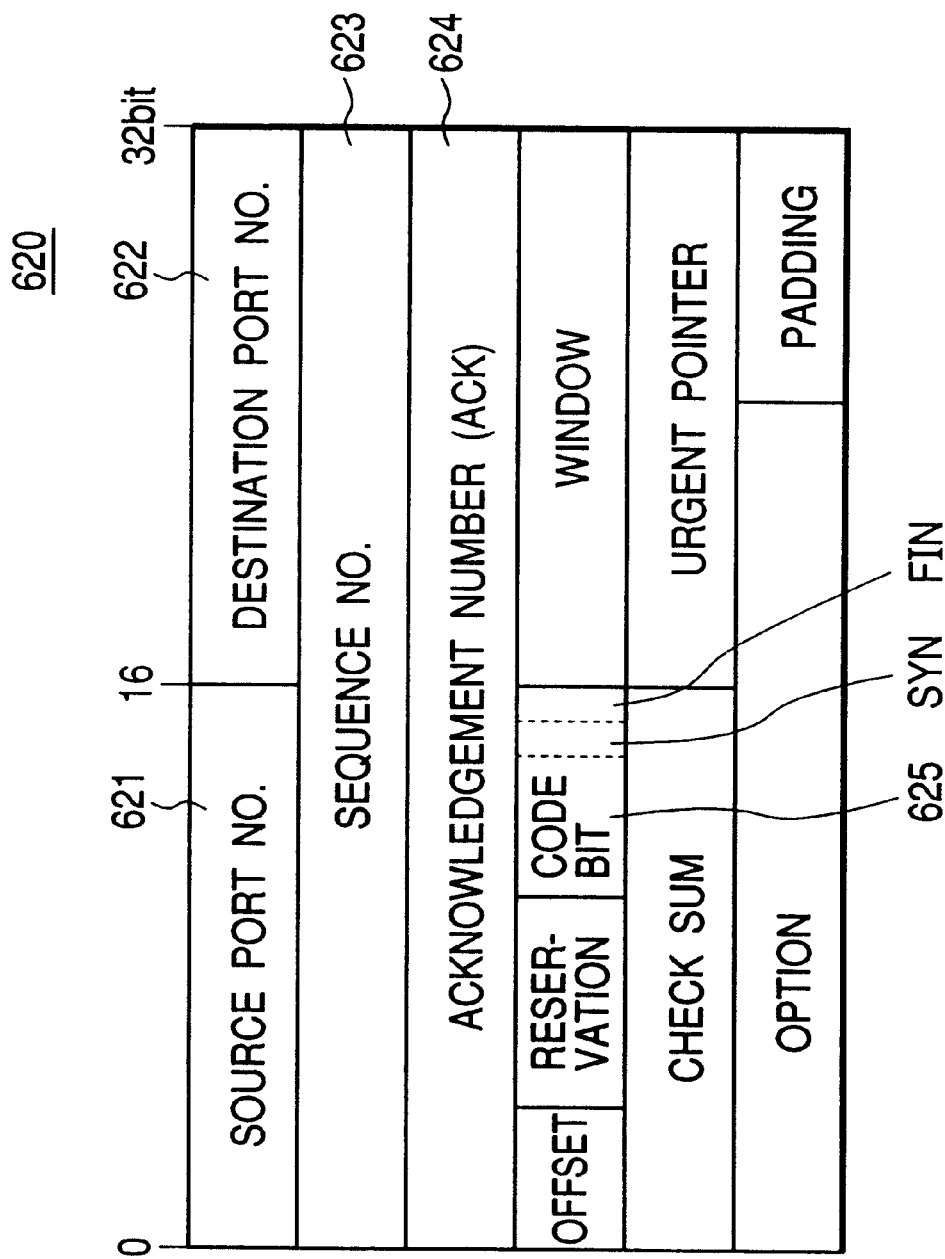
FIG. 12 is a diagram illustrating a configuration of a TCP header.

That is, according to the TCP header, a 6-bit of code bit region 625 is defined as shown in FIG. 12, in addition to control information such as a source port number 621 and a destination port number 622 for specifying one of applications within a transmitting and receiving system, a sequence number 623 indicative of a data segment position in a transmit data stream, an acknowledgment number 624, etc. The fifth bit and the sixth bit of the code bit region are used as a synchronous (SYS) bit and a transfer finish (FIN) bit, respectively.

Upon the establishment of the communication connection, a TCP packet in which the SYS bit is set to "1", is transmitted and received between the data communication terminals to which the TCP is applied. Upon the disconnection of the communication connection, a TCP packet in which the FIN bit is set to "1", is transmitted and received between the terminals. Accordingly, as to a packet received from a TCP terminal, it possible to determine the entry priority of routing information by extracting the seventh byte of the TCP header including the SYS bit and FIN bit, in place of the first byte of the aforementioned IP header, by the control information extractor circuit 16 shown in FIG. 5, and by checking the two least significant bits of the seventh byte of the TCP header by the processor 17 when the routing information entry of the sub routing table 15 is updated.

Whether or not the IP packet includes a TCP header in the data field 62, can be determined by referring to a protocol type included in the IP header. Therefore, as a preferred embodiment of the present invention, for example, the control information extractor circuit 16 may extract the first byte including a TOS field, the fifth byte including a protocol type, the ninth and tenth bytes including a destination IP address, and the nineteenth byte (the seventh byte of TCP header) in which the TCP code bit regions is located, from the respective IP packets. In this case, the processor 17 identifies the protocol type to determine the effectiveness of the 19th byte. If the 19th byte is found to be effective (i.e. including the code bits of TCP), the establishment or disconnecting of the connection may be determined according to the logical OR of the check result of a flag bit in the TOS field and the check result of the SYS bit and FIN bit in the TCP code bit region.

Control for updating the sub routing table 15 employed in the communication node apparatus according to the present invention will be described hereinafter, specifically.

Figure 13:
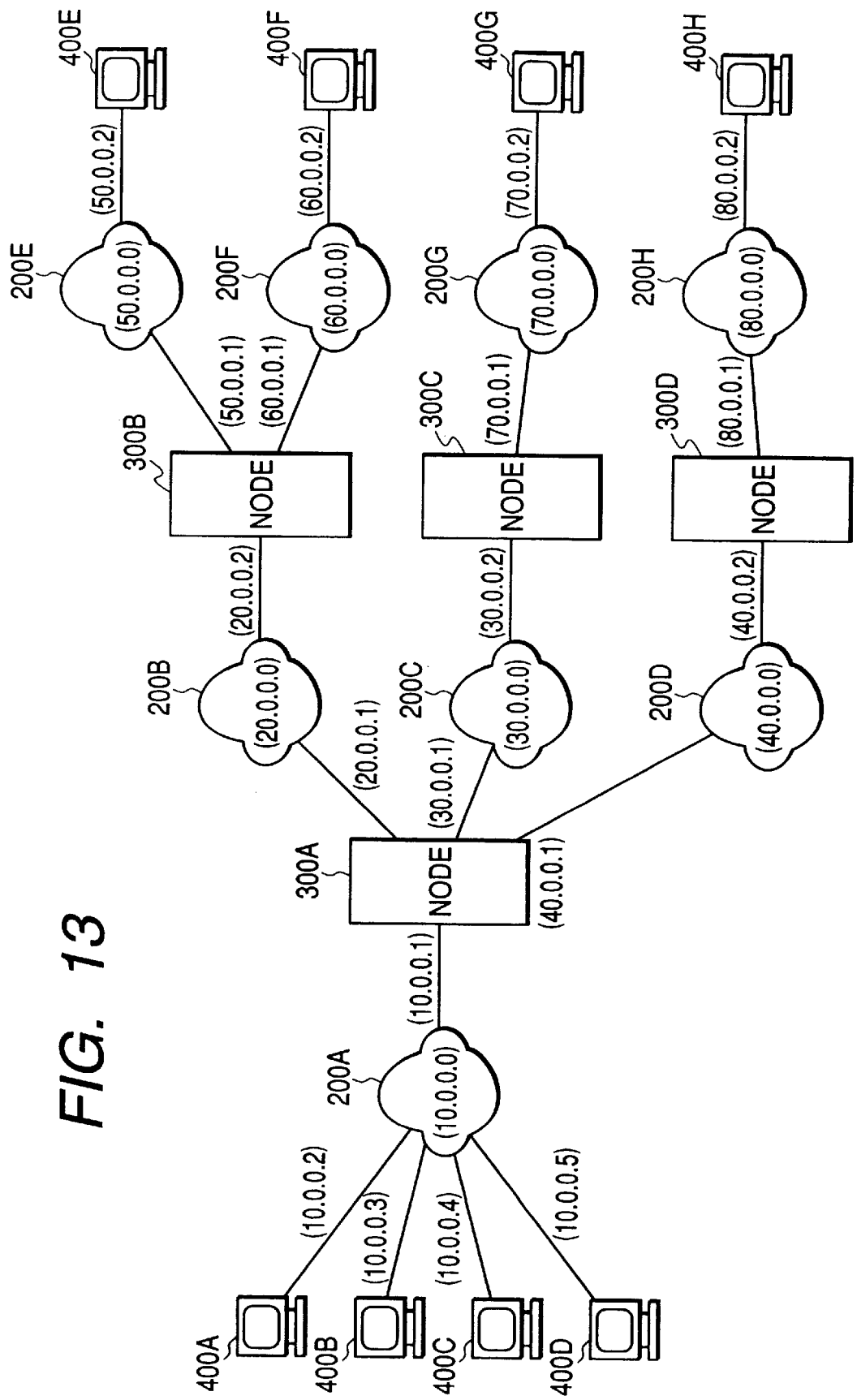
FIG. 13 is a diagram illustrating one example of a communication network to which the communication node apparatuses according to the present invention are applied.

FIG. 13 shows one example of a data communication network constructed by a plurality of data terminals and a plurality of communication node apparatuses according to the present invention.

In FIG. 13, reference numerals 400A through 400H indicate data communication terminals. For convenience of illustration in the present example, designated at numerals 400A through 400D are the data communication terminals on the transmitting side, whereas designated at numerals 400E through 400H are the data communication terminals on the receiving side. At least the respective data communication terminals 400A through 400D on the transmitting side will be provided with the aforementioned function of setting the connection establishment/disconnection flag to the IP header or the function of setting the SYS/FIN bit of the TCP header.

Reference numerals 300A through 300D respectively indicate communication node apparatuses each having the configuration shown in FIG. 1, which are provided with the line Interface boards 1-i (where i=1 to n) shown in FIG. 5. Reference numerals 200A through 200H respectively indicate networks accommodating the aforementioned data communication terminals and communication node apparatuses. Numeral (xx.xx.xx.xx) shown inside the parentheses indicates an IP address of input/output interface (line interface board 1-i) of each of the data communication terminals and communication node apparatuses, or an IP address of the network.

Now consider, as to the communication node apparatus 300A, that the line interface board 1-1 shown in FIG. 1, is connected to the network 200A, the line interface board 1-2 is connected to the network 200B, the line interface board 1-3 is connected to the network 200C and the line interface board 1-4 is connected to the network 200D, and that the data communication terminal 400A sends packets to the data communication terminal 400E.

The data communication terminal 400A on the transmitting side issues a packet (hereinafter called "first packet") having an address value "50.0.0.2" as a destination IP address (DA) 614 and being added a connection establishment flag to an IP header (or added a SYS bit to a TCP header) upon starting the communication. The first packet may be a normal user packet including effective data in a data portion 62 or a dummy packet which is issued merely for the purpose of instructions to establish such a connection (instructions for the registration of a priority routing information entry) and including no effective data in the data portion 62.

When packet signals including the first packet have arrived at the communication node apparatus 300A via the network 200A, the line interface board 1-1 performs a terminating process on a signal received from the input line IN-i at the input line interface 11 thereof and refers to or retrieves the sub routing table 15 by using a DA extracted from the IP header of the received IP packet as a retrieval key. Since no corresponding entry exits in the sub routing table 15 when the first packet has been received, the processor 17 makes a request to the route management unit 5 for download about the routing information entry of DA "50.0.0.2".

When the processor 51 of the route management unit 5 retrieves an object entry from the main routing table 55 and answers it to the processor 17 of the line interface board 1-1 corresponding to the request source, the object entry is registered in the sub routing table 15 in such a form as indicated by an entry 150-1 shown in FIG. 14. Here, information downloaded from the route management unit 5 is set to an DA 151, a Next Hop address 152 and an output port number 153, respectively, and a status value "1" (priority entry) is set to an entry priority 154 because the connection establishment flag was detected from the leading packet.

When the object entry is downloaded to the line interface board 1-1 from the route management unit 5, the first packet is converted to fixed-length short packets (cells) by the cell assembler circuit 13, followed by transfer to the packet forwarding unit 3. Since, in this case, an output port number "2" is set to internal headers of the respective cells generated from the first packet, these cells are transferred to the line interface board 1-2 through the packet forwarding unit 3.

In the line interface board 1-2, the packet assembler circuit 21 converts the cells outputted from the packet forwarding unit 3 to an IP packet having a Next Hop address "20.0.0.2" at its leading portion. Further, the output line interface 23 retrieves the physical address of a line interface board of the communication node apparatus 300B indicated by the Next Hop address "20.0.0.2" by referring to the address conversion table 22 and converts the IP packet to a data link layer frame, followed by transmission to an output line OUT-2.

At the processing of the second and subsequent packets sent out from the data communication terminal 400A, the necessary routing information has already been registered in the sub routing table 15 of the line interface board 1-1. Therefore, each received packet can be immediately subjected to routing processing without the support of the route management unit 5.

If the data communication terminals 400B and 400C start to communicate with 400F and 400G respectively after the data communication terminal 400A has started the above communication, new entries 150-2 and 150-3 are additionally registered in the sub routing table 15 of the communication node apparatus 300A as shown in FIG. 15.

In the present example, the entry priority of the entry 150-2 is given as "1" because the data communication terminal 400B sets the connection establishment flag to the first packet. Since, however, the data communication terminal 400C starts the transmission of packets without establishing a connection, the entry priority of the entry 150-3 results in "0".

Now consider that the data communication terminal 400B sends out a packet (hereinafter called "final packet"), which is provided with a disconnection flag and includes an address value "60.0.0.2" as a destination IP address 614, in order to complete the communication with the data communication terminal 400F. The final packet may be a normal user packet including effective data in the data portion 62 or a dummy packet intended merely for instructions for the deletion of routing information, similarly to the connection establishment.

The line interface board 1-1 of the communication node apparatus 300A having received the final packet transfers the final packet to the output line OUT-2 directed to the communication node apparatus 300B by referring to the sub routing table 15. At this time, since the disconnection flag is detected from the received packet, the entry 150-2 is deleted from the sub routing table 15, whereby an idle area is prepared in the sub routing table 15 as shown in FIG. 16.

If another data communication terminal 400D establishes a connection with the data communication terminal 400H and starts to communicate therewith after the data communication terminal 400B has terminated its communication, the line interface board 1-1 of the communication node apparatus 300A downloads a routing information entry to the sub routing table 15 in accordance with a procedure similar to that taken upon reception of the first packet from the data communication terminal 400A. Since, at this time, the idle area is formed in the sub routing table 15 due to the deletion of the entry 150-2, a new entry 150-4 for the data communication terminal 400D can be registered in the idle area as shown in FIG. 17.

As the number of downloads of new entry to the sub routing table 15 increases and no idle area exists in the sub routing table 15, it is required to sacrifice any of the already-registered entries to overwrite a new entry thereon. According to the present invention in this case, the registered entries of the sub routing table 15 include not only the entries with the priority in the "1" state, but also the entries with the priority in the "0" state, as shown in FIG. 17. The entries with the priority in the "1" state, indicate that their connections continue at present and the subsequent packets which require the registered entries are expected to arrive. However, as to the entries with the entry priority in the "0" state, it is difficult to expect the subsequent packets requiring such registered entries will arrive for sure. Accordingly, when the idle area lacks, one of the entries with the entry priority in the "0" state, may be sacrificed to entry a new entry thereon.

As a method of selecting one entry to be sacrificed among an entry group having the same priority, various algorithms such as (a) an algorithm for selecting object entries at random whenever necessary, (b) an algorithm for storing the position of a finally-selected entry by a pointer and circularly scanning the entries in a predetermined direction as viewed from the position indicated by the pointer next time to select an object entry, etc. can be applied. Registering time may be stored for each entry in the sub routing table so that one of the entries having the longest survival time can be sacrificed.

According to the line interface board 1-i shown in FIG. 5, the routing processing on a received packet having the routing information entry already registered in the sub routing table 15 can be achieved within the line interface board 1-i without communications with the route management unit 5. Accordingly, if the routing table access circuit 14 and the cell assembler circuit 13 are constructed in a form of ASIC (Application Specific Integrated Circuit: IC for specific application), for example, it is possible to realize the transfer of packets at high speed under the operation of the hardware circuit. If a content addressable memory (CAM) structure capable of immediately reading out the contents of an object entry by offering a destination IP address, for example, is applied as the sub routing table 15, then the above-described packet transfer operation can be further speeded up.

Figure 18:
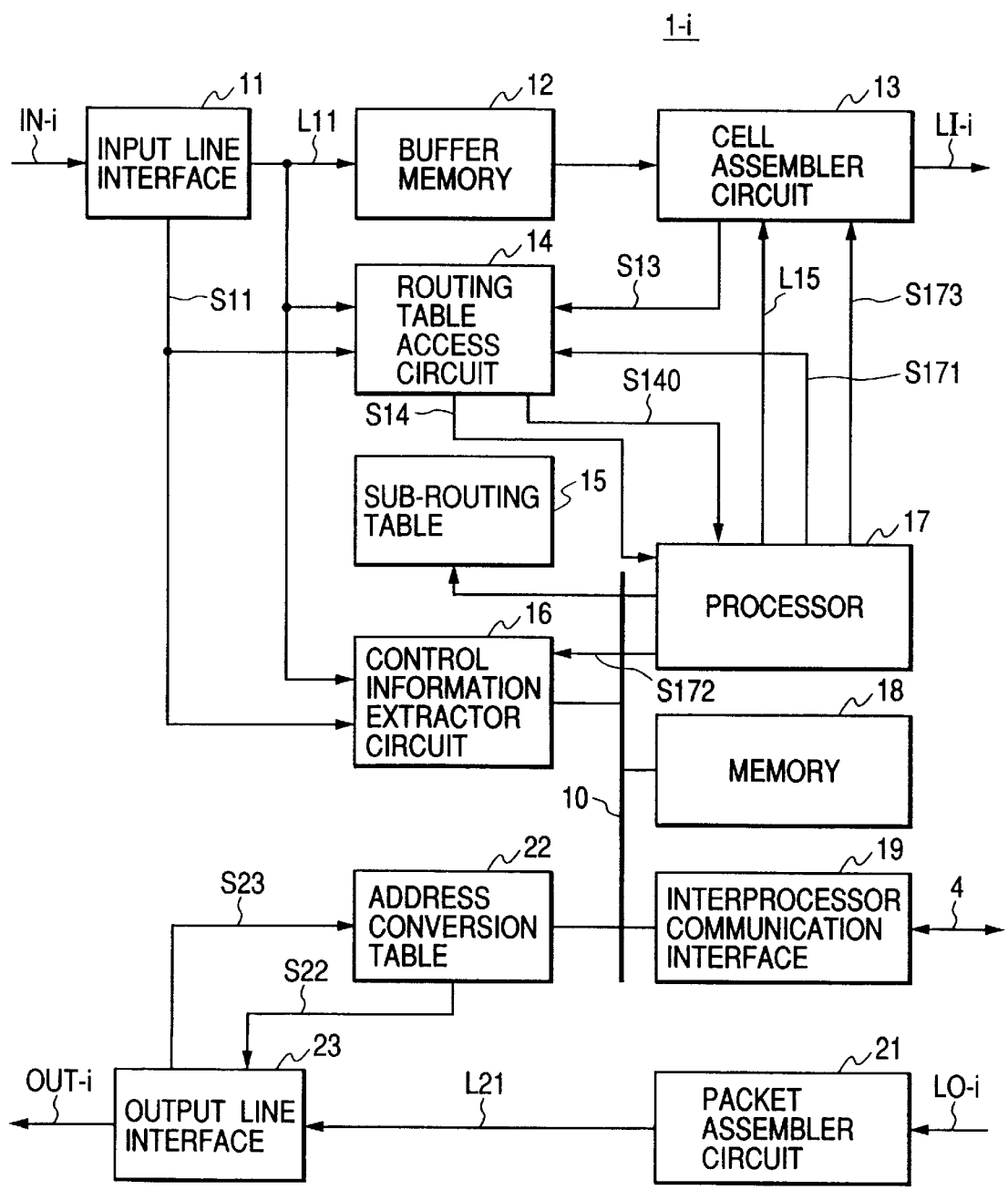
FIG. 18 is a structural diagram illustrating another embodiment of the line interface board 1-i shown in FIG. 1.

In the embodiment shown in FIG. 5, the routing table access circuit 14 accesses to the sub routing table 15 and the output of the sub routing table 15 is determined by the processor 17. As an alternative to this, however, another example may be used as shown in FIG. 18 by way of example. That is, a destination IP address S14 extracted by a routing table access circuit 14 is read into a processor 17. The processor 17 reads out an object entry from a sub routing table 15 through the internal bus 10 and supplies routing information (Next Hop address and output port number) included in the object entry to a cell assembler circuit 13 through a signal line L15. Since, in this case, a table retrieval based on a program is made possible and the processor 17 serves at all time as a source for supplying the routing information to the cell assembler circuit 13, it is unnecessary to supply a hold signal S171 to the cell assembler circuit 13.

As a further modification of the present invention, the routing table access circuit 14 may be provided with the function of retrieving the sub routing table 15 and the function of determining the result of retrieval so that the routing table access circuit 14 notifies the presence or absence of an object to the processor 17 for each IP packet and supplies routing information to the cell assembler circuit 13 when the object entry is found in the sub routing table 15.

In the embodiments shown in FIGS. 5 and 18, each of the line interface boards converts the received packet to the fixed length short packets and outputs the same to the packet forwarding unit. However, the control on the updating of the sub routing table according to the present invention can be applied even to such a line interface board that outputs the received packet to the packet forwarding unit as it is the variable length.

According to the present embodiment, as is apparent from the above descriptions of the embodiments, since effective routing information entries are left in a sub routing table prepared as a cache memory for each line interface board, and the unnecessary routing information entries are eliminated with good timing, it is easy to additionally register new entries in the sub routing table.

According to the present invention as well, information indicative of entry priority is stored for each entry in the sub routing table. Thus, when no idle area exists in the sub routing table, one of the entries with low priority can be sacrificed to additionally register a new entry while leaving the entries with high priority in the sub routing table. It is therefore possible to improve a hit ratio for retrieval of routing information from the sub routing table and speed up the routing processing of the received packet. Further, since the capacity of the sub routing table is effectively utilized by deleting unnecessary entries with good timing, it is possible to maintain a high reference or high retrieval hit ratio with a cache memory having relatively small capacity.

What is claimed is:

1. A communication node apparatus, comprising:
   a route management unit having a main routing table for storing therein a plurality of routing information entries necessary for the communication node; and
   a plurality of line interfaces respectively equipped to every one of a plurality of input and output lines;
   each of said line interfaces including;
      a sub routing table for storing therein a limited number of routing information entries loaded from said route management unit;
      a received packet processing circuit for performing routing processing on a packet received from one of said input lines by referring to said sub routing table; and
      a table management unit for eliminating a specific routing information entry already registered in said sub routing table, when predetermined information is extracted from a packet received from one of said input lines.

2. The communication node apparatus according to claim 1, wherein said table management unit includes means for checking a control information field defined in a predetermined position of each packet received from said plurality of input lines and deleting a specific routing information entry, which corresponds to a specific packet having first control information contained in the control information field, from said sub routing table.

3. The communication node apparatus according to claim 1, wherein said table management unit includes registering means for requesting said route management unit to download a non-registered routing information entry corresponding to a packet received from one of said plurality of input lines and registering a new routing information entry downloaded from said route management unit in said sub routing table.

4. The communication node apparatus according to claim 3, wherein said registering means includes means for checking control information field defined in a predetermined position of the packet received from said input line, and registering into said sub routing table a routing information entry, which was downloaded in association with a specific packet including second control information in the control information field, by adding a high priority indication.

5. The communication node apparatus according to claim 4, wherein said registering means includes means for registering a new routing information entry in said sub routing table by sacrificing any free of the high priority indication, of the routing information entries already registered in said sub routing table when an idle area is absent in said sub routing table.

6. The communication node apparatus according to claim 2, wherein said control information field to be checked by said table management unit is defined in a header of each of said received packets.

7. The communication node apparatus according to claim 2, wherein said control information field to be checked by said table management unit is defined in a data field of each of said received packets.

8. A communication node apparatus, comprising:
   a route management unit having a main routing table for storing therein a plurality of routing information entries necessary for the communication node;
   a plurality of line interface boards respectively equipped to every one of a plurality of input and output lines; and
   a packet forwarding unit for transferring packets between said line interface boards;
   each of said line interface boards including;
      a sub routing table for storing therein a limited number of said routing information entries loaded from said route management unit;
      an input interface for reading out one of said routing information entries from said sub routing table, based on a destination address of a packet received from said input line, adding output port information included in said one of said routing information entries to said packet and outputting the packet to said packet forwarding unit;
      an output interface for eliminating said output port information from the packet received from said packet forwarding unit and sending out the packet to one of said output lines; and
      a table management unit for making a request to said route management unit for download a non-registered routing information entry corresponding to the packets received from said input line, registering a new routing information entry downloaded from said route management unit in said sub routing table, and deleting a specific routing information entry already registered in said sub routing table, when predetermined information is extracted from a packet received from one of said plurality of input lines.

9. The communication node apparatus according to claim 8, wherein said input interface includes a first packet converter circuit for dividing a variable length packet received from said input line into a plurality of data blocks, and outputting said data blocks as fixed length packets by adding internal headers including said output port information to each of said data blocks, and a second packet converter circuit for eliminating the internal headers from fixed length packets received from said packet forwarding unit and assembling data blocks into an original variable length packet, and said packet forwarding unit transfers the fixed length packets between said line interface boards.

* * * * *